United States Patent [19]

DeVisser

[11] 4,218,926
[45] Aug. 26, 1980

[54] ISOLATING PRESSURE SENSOR

[75] Inventor: Richard B. DeVisser, Schoolcraft, Mich.

[73] Assignee: Dover Corporation, Portage, Mich.

[21] Appl. No.: 6,428

[22] Filed: Jan. 25, 1979

[51] Int. Cl.³ .............................................. G01L 7/08
[52] U.S. Cl. ........................................ 73/730; 73/756
[58] Field of Search .................... 73/730, 119 A, 706, 73/756

[56] References Cited

U.S. PATENT DOCUMENTS

| 3,163,529 | 12/1964 | Jewett | 73/730 |
| 3,563,095 | 2/1971 | Robinson, Jr. | 73/730 |

FOREIGN PATENT DOCUMENTS 7513414  5/1977  Netherlands ............................... 73/730

*Primary Examiner*—Donald O. Woodiel
*Attorney, Agent, or Firm*—Blanchard, Flynn, Thiel, Boutell & Tanis

[57] ABSTRACT

A narrow pressure sensor unit interposable between close spaced flanges on coaxially opposed pipes. The pressure sensor unit includes an annular body sandwiched coaxially between two flanking rings of lesser inside diameter by a circumferential array of axial fasteners. A resilient cylinder has an intermediate portion spaced radially inward of the annular body by an annular sensing fluid chamber. The cylinder is of generally U-shaped cross section and has sides extending radially outward along annular reliefs in the flanking disks. Axially widened lips on such sides lie in opposed annular grooves in the flanking rings, and are compressed between the axially opposed surfaces of the respective flanking ring groove and body to seal the fluid chamber. The lips are radially wider than the axial width of the reliefs to lock the lips in the grooves. A pressure gauge connects through the body to the sensing fluid chamber.

20 Claims, 7 Drawing Figures

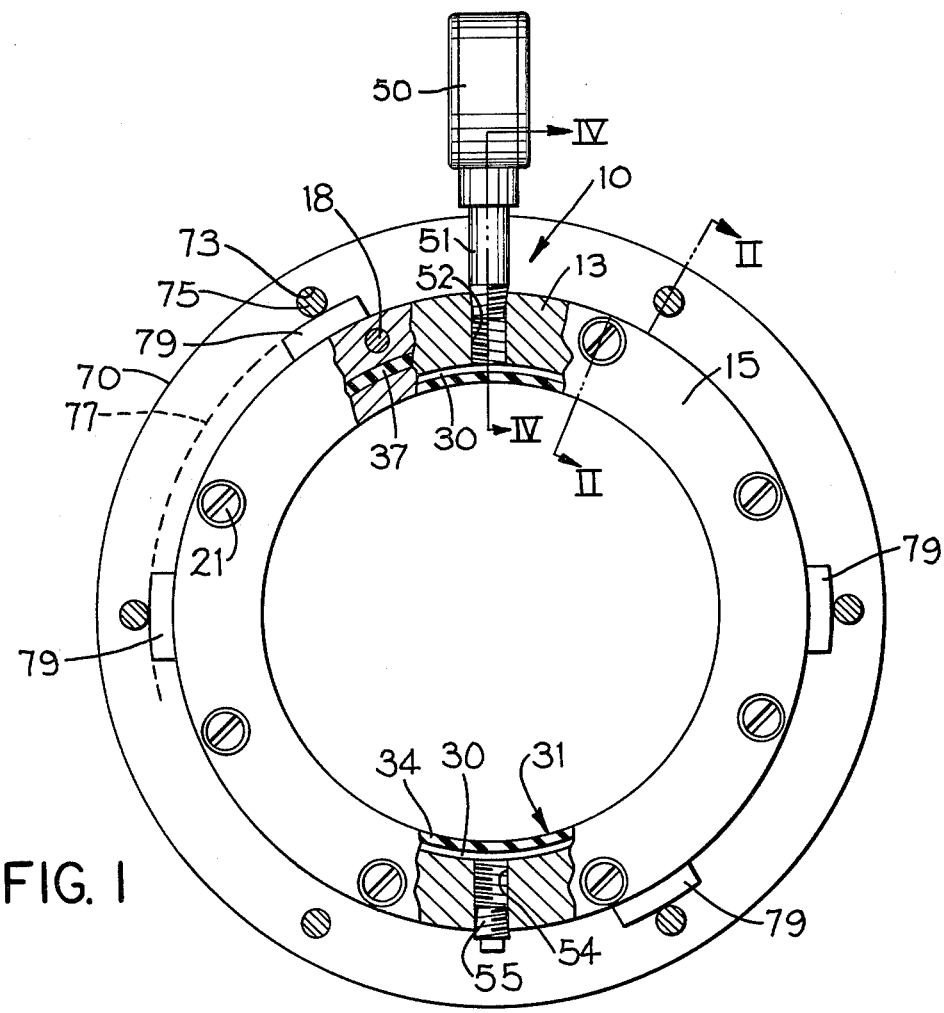
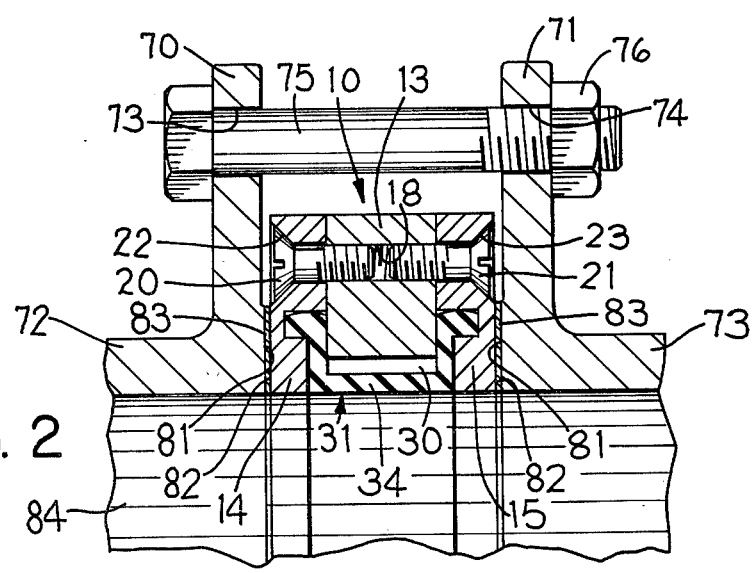

ISOLATING PRESSURE SENSOR

FIELD OF THE INVENTION

The present invention relates to pressure sensing devices and more particularly to an isolating pressure sensor for measuring the pressure of fluid in a line without interrupting the flow or directly contacting the pressure responsive element with the process fluid in the line.

BACKGROUND OF THE INVENTION

In typical prior isolating pressure sensors the pressure responsive element, e.g. pressure gauge, senses the pressure of the process fluid flowing in the line through an intermediary sensing fluid isolated from the process fluid by a resilient pressure transmitting member. Such isolating pressure sensors may be used, for example, where contact with the process fluid (e.g. an acid) would damage the pressure gauge. U.S. Pat. No. 3,163,529 and No. 3,563,095 disclose examples.

In one type of prior isolating pressure sensor for interposition coaxially between flanged ends of a coaxially opposed pair of pipeline sections, a U-shaped tube of resilient material contains the sensing fluid. A rigid body member interposed between the pipeline flanges has a bore coaxial with the pipeline. A circumferential, radially inward facing groove in the bore houses the hemicircular bight of the U-shaped tube. The ends of the tube extend tangentially from the bore through elongate parallel passages in an eccentrically extended portion of the body member and connect at the radially outboard end of the latter through fittings to a closable fill plug and a pressure gauge.

Several apparent problems are noted in prior systems of the latter type. Several factors tend to limit sensitivity, including exposure of the sensing fluid containing tube to less than the full circumference of the pipeline passage, location of a major portion of the sensing fluid tube out of contact with pipeline pressure, and (to limit the tendency of the bight portion of the tube to be swept from its groove by fluid flow through the pipeline) the desirability of relatively stiff tube material and of housing most of the cross section of the tube snugly within the groove and which tends to limit free expansion and contraction of the tube in response to changes in pipeline pressure. Also, such prior systems are complicated by the need for special connectors to connect the ends of the resilient tubing within the body member to rigid pipe fittings for the pressure gauge and fill plug. Further, substantial variations in pipeline pressure may tend to push and pull the tangential portions of the tube and cause same to creep axially, creating difficulty in maintaining a seal at the tube ends and in maintaining the tube bight portion in its groove at high process fluid flow rates. Further, although a circular cross section is compatible with conventional end connectors, such circular cross section is inherently more resistant to flexure of the tubing wall than would be a flat cross section, again tending to reduce sensitivity to small changes in pressure in the pipeline fluid.

A second type of prior isolating pressure sensor avoids some of the difficulties noted above, and provides an axially elongate body member of substantially U-shaped wall cross section having a cylindrical central portion terminating in radially outwardly extending end flanges. A resilient cylindrical member is coaxially spaced within the body member by an elongate annular sensing fluid chamber. Annular end plates coaxially fixed to the body member flanges axially press radially outwardly extending end flanges on the resilient member into corresponding, annular axially outward and radially inward opening reliefs at respective ends of the central portion of the body member for the purpose of sealing the ends of the annular fluid chamber. A pressure sensor of this latter kind is disclosed in aforementioned U.S. Pat. No. 3,563,095, assigned to the assignee of the present invention, and has been found to be generally satisfactory in use.

However, in a continuing effort to improve isolating pressure sensors, the present applicant has found that further improvement is possible, for example by reducing cost of and space required for the pressure sensor, particularly for larger diameter pipe systems, and in terms of positive securement of the resilient cylinder member.

Accordingly, the objects of this invention include provision of:

An isolating fluid pressure sensor for a pipeline in which a resilient cylinder, separating a surrounding sensing fluid space from process fluid flowing in the pipeline, has ends positively locked against inadvertent removal from the pressure sensor, even under difficult conditions, e.g. relatively high process fluid flow rates, changing and high process fluid pressures, use with thick or high friction process liquids, etc.

A pressure sensor, as aforesaid, which is compact in axial and radial thickness, and which can be securely sandwiched between end flanges of coaxially opposed pipe sections entirely within the confines of a standard flange bolt circle.

A pressure sensor, as aforesaid, in which the same pressure sensor unit may be used between various styles of pipe flanges without modification, despite substantial variation in bolt hole size, number and location, given correspondence in the internal diameter of the pipe flanges and the pressure sensor.

A pressure sensor, as aforesaid, which is of simple, economical construction.

A pressure sensor, as aforesaid, in which the pressure sensor can be stored and shipped precharged with sensing fluid without fear of leakage past the resilient cylinder, but wherein bolting of the pressure sensing unit between coaxial pipeline flanges tends to even more tightly seal sensing fluid and process fluid interfaces in the sensor.

Other objects and purposes of the invention will be apparent to persons acquainted with apparatus of this general type upon reading the following specification and inspecting the accompanying drawings.

SUMMARY OF THE INVENTION

The objects and purposes of this invention are met by providing a narrow pressure sensor unit interposable between close spaced flanges on coaxially opposed pipes. The pressure sensor unit includes an annular body sandwiched coaxially between two flanking rings of lesser inside diameter by a circumferential array of axial fasteners. A resilient cylinder has an intermediate portion spaced radially inward of the annular body by an annular sensing fluid chamber. The cylinder is of generally U-shaped cross section and has sides extending radially outward along annular reliefs in the flanking disks. Axially widened lips on such sides lie in opposed annular grooves in the flanking rings, and are compressed between the axially opposed surfaces of the respective flanking ring groove and body to seal the fluid chamber. The lips are radially wider than the axial width of the reliefs to lock the lips in the grooves. A pressure gauge connects through the body to the sensing fluid chamber.

BRIEF DESCRIPTION OF THE DRAWINGS

FIG. 1 is a partially broken view of the pressure sensor embodying the invention taken from one axial end thereof and shown coaxially superimposed on a pipeline flange.

FIG. 2 is an enlarged fragmentary sectional view of the pressure sensor of FIG. 1 shown in a position of installation between end flanges of a pair of coaxially aligned pipe sections.

DETAILED DESCRIPTION

Figure 3:
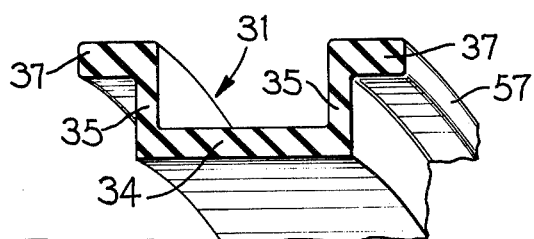
FIG. 3 is a fragmentary oblique view of the resilient cylinder of FIG. 2.

FIGS. 1 and 2 disclose a pressure sensor 10 embodying the invention. The pressure sensor 10 comprises three coaxially sandwiched disks 13, 14 and 15, hereinafter referred to as an annular body 13 interposed between preferably identical flanking rings 14 and 15. As seen in FIG. 2, disks 13–15 are substantially rectangular in cross section. Each may be formed by cutting from plate stock and subsequently machined as hereafter discussed.

To releasably secure annular body 13 between flanking rings 14 and 15, the radially outer part of body 13 is provided with an evenly circumferentially distributed array of threaded holes 18 extending axially therethrough. The flanking rings have respective corresponding circumferential arrays of countersunk holes 22 or 23. Each threaded hole 18 receives a coaxially opposed pair of screws 20 and 21 extending snugly but slidably through and countersunk in coaxially aligned ones of the holes 22 and 23 in the respective flanking rings 14 and 15. The heads of screws 20 and 21 lie at or slightly below the corresponding radial face of the respective flanking ring. Aligned screws 20 and 21 are short enough not to interfere with each other when tightened as seen in FIG. 2. To maintain the outside diameter of pressure sensor members 13–15 free of interference with the smallest diameter pipe flange bolt circle (hereafter described) with which they are to be used, screws 20 and 21 are located with their heads close to the outer periphery of the flanking rings 14 and 15 as shown. The outside diameters of annular disks 13–15 are preferably the same.

The radially inner wall 27 (FIG. 4) of annular body 13 is larger in diameter than the radially inner wall 28 of flanking rings 14 and 15. In the preferred embodiment shown, wall 27 is cylindrical.

A cylinder 31 of elastomeric material (FIGS. 2–4) is of substantially U-shaped, preferably symmetrical, cross section having a cylindrical, resiliently flexible bight wall 34 radially spaced inboard of the inner wall 27 of annular body 13 and radially outward extending sides integrally formed at the axially outer ends of bight wall 34. Sides 35 are preferably axially spaced by the axial thickness of annular body 13 to snugly receive the radially inner portion of such annular body 13 therebetween. Thus, an annular sensing fluid chamber 30 is entirely bounded by annular body wall 27, and the bight 34 and sides 35 of the rubber-like cylinder 31.

The radially extending sides 35 of cylinder 31 terminate in annular, axially outwardly extending lips 37. The lips 37 are thus axially backed by the axial end walls 38 of annular body 13 and extend axially away therefrom.

A coaxial annular groove 41 (FIGS. 4 and 5) is provided in the axially inward face 42 of each flanking ring 14 and 15. Groove 41 is radially located on its flanking ring to receive the corresponding lip 37 of cylinder 31 therein. In the preferred embodiment shown, the inner radius of groove 41 corresponds closely to the inner radius of lip 37. For purposes appearing hereafter, the axial depth D (FIG. 4) of groove 41 is substantially less than the axial extent E of lip 37, the elastomeric lip 37 being axially compressible, as indicated in FIG. 5, down to the axial dimension D of groove 41. In one example, the uncompressed axial extent E of lip 41 was about 22 percent in excess of the depth D of groove 41, though it is contemplated that such excess may vary from about 15% to 30%. To allow room for radial expansion of lip 41 during axial compression thereof, the groove 41 is radially wider than the uncompressed lip 37, in one example by about 30%, though percentages in the range of about 20% to 40% are contemplated.

Figure 4:
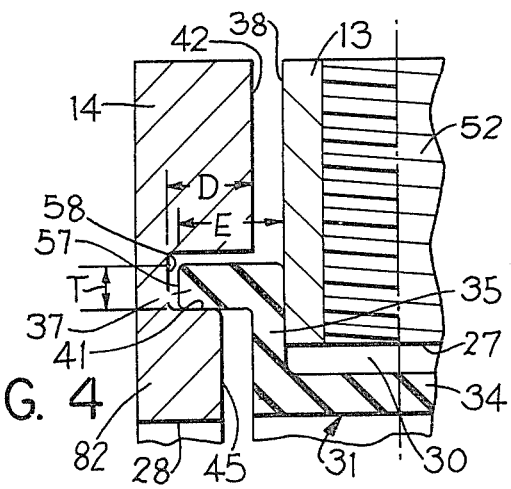
FIGS. 4 and 5 are enlarged fragmentary cross sectional views of the pressure sensor of FIG. 2 showing initial and final assembly states thereof.
Figure 5:
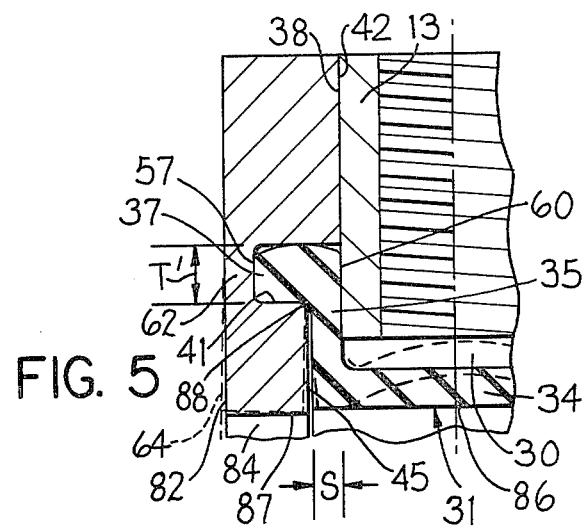

The axially inner face 42 of each of flanking rings 14 and 15 is relieved radially inward of groove 41, as indicated at 45 in FIG. 4. When flanking rings 14 and 15 are snugly sandwiched against annular body 13, as in FIGS. 2 and 5, each side 35 of resilient cylinder 31 is disposed with or without axial compression thereof, in the corresponding annular relief space between annular body side wall 38 and the opposed surface 45 of the flanking ring. In one example, the axial relief space between faces 45 and 38 exceeded the axial thickness of resilient cylinder side 35 by about 15% though it is contemplated that this may range from less than zero up to about 25%. Such excess permits come creep or radial compression of side 35 into such relief space and/or flexing of such side, during pressurization of a pipeline in which pressure sensor 10 may be installed as hereafter described.

Pressure sensor 10 further includes a conventional pressure gauge 50 (FIG. 1) having a pressure fluid input nipple 51 engaged in a threaded opening 52 extending radially through annular body 13, preferably in axially centered relation with body 13 and through which the pressure gauge 50 communicates with annular sensing fluid chamber 30. Radial threaded opening 52 is circumferentially spaced between an adjacent pair of the axial holes 18 so as to avoid interference therewith. A similar, radially extending, threaded opening 54 also extends radially through annular body 13, preferably in diametral opposition to pressure gauge 50, for draining sensing liquid from annular chamber 30, and for eliminating air bubbles when filling the sensing fluid chamber. A drain plug 55 normally closes opening 54.

To assemble pressure sensor 10, outward bending of one of side walls 35 permits resilient cylinder 31 to be slid axially into its use position of FIGS. 2 and 4 within annular body 13. Thereafter, flanking plates 14 and 15 are moved coaxially to loosely sandwich annular body 13, so the annular lips 37 of resilient 31 enter their respective annular grooves 41 in the flanking rings. The circumferential arrays of screws 20 and 21 are inserted through their respective flanking ring holes 22 and 23 and threaded into annular body holes 18 to draw the flanking rings 14 and 15 axially from the FIG. 4 position toward the FIGS. 2 and 5 position shown. The screws 20 and 21 coaxially center flanking rings 14 and 15 and resilient cylinders 31 with respect to annular body 13. As such screws are tightened, the axially outer edge 57 of lip 37 is progressively axially compressed between the blind end wall 58 of groove 41 and the opposed axial end face 38 of annular body 13.

Tightening screws 20 and 21 eventually brings flanking rings 14 and 15 tightly against annular body 13 with their opposed walls 42 and 38 contacting face-to-face as seen in FIG. 5. In this condition, lip 37 is axially compressed and, to accomodate such axial compression, radially expanded to further, but not completely, fill radially the cross section of groove 41. Such compression of lip 37 creates fluid tight seals where its axially outer and inner surfaces 57 and 60 tightly engage the respective opposed surfaces 57 and 38 of groove 41 and annular body 13.

Assembly of the pressure sensor 10 is completed by filling the annular sensing chamber with sensing fluid and installing plug 55 and pressure gauge 50 in respective radial openings 54 and 52 in annular member 13. Filling with sensing fluid may be done in any conventional manner as through opening 54 after installation of gauge 50. With the pressure sensor 10 thus fully assembled, same is ready for storage, shipment or installation in a pipeline as hereafter discussed.

Only moderate pressure is required at surface 60 to contain sensing fluid in chamber 30 with the pressure sensor 10 in storage or shipment at atmospheric pressure. Accordingly, the axial width of pressure sensor 10 and the amount of material required therefor are minimized by making the flanking rings 14 and 15 axially thin, such that the annular groove 41 penetrates deeply into the axial width of the flanking ring 14 or 15 and leaves only an axially narrow annular web 62 connecting the radially inner and outer parts of the flanking ring. In the embodiment shown, the axial width of the web 62 is only about one-quarter the maximum axial width of the flanking ring 14. Thus, the radially inner portion of the flanking ring may tend to flex axially outward somewhat, as exaggeratedly indicated in broken lines at 64, prior to installation in a pipeline, due to the axially outward pressure of the compressed resilient lip 37 but this flexing does not impair the aforementioned seal at surface 60.

The pressure sensor 10 is sized to fit a given pipeline by inside diameter, i.e. so the inside diameters of the pipeline and pressure sensor 10 are similar, thereby minimizing interference with flow and turbulence at the joinder of the pipeline to the pressure sensor. However, as long as the inside diameter matches, same pressure sensor 10 can be used with a variety of standard pipe flanges, one embodiment being intended for use with, for example, 150 psi, 300 psi and European standard flanges.

Pressure sensor 10 is shown in FIG. 2 installed in a typical position of use coaxially between conventional end flanges 70 and 71 of coaxially opposed pipe segments 72 and 73, respectively. The pipe flanges 70 and 71 are respectively provided with conventional arrays of circumferentially distributed bolt holes 73 and 74 coaxially alignable for receiving bolts 75 on which nuts 76 are tightenable to sandwich pressure sensor 10 coaxially between pipes 72 and 73. The effective inner diameter of the bolt circle (i.e. the diameter of a circle drawn contiguous to the radially inner surface of the several bolts 75 and partially indicated in broken lines at 77) may come close to the outside diameter of annular disks 13-15, in which case contact between the bolts 75 and the periphery of disks 13-15 tends to center the pressure sensor 10 coaxially of pipes 72 and 73. However, the same pressure sensor 10 can be used with flanges having bolt circles of larger diameters, as for example in FIGS. 1 and 2, in which case the installer may coaxially center pressure sensor 10 with respect to pipe section 72 and 73 by eye, or by use of temporary shims 79 inserted between bolts 75 and the opposed periphery of disks 13-15.

Tightening of nuts 76 axially forces the annular sealing surfaces 81 of flanges 70 and 71 against gaskets 83 and inner portion of the end faces 82 of flanking rings 14 and 15 with a compression force sufficient to eliminate any of the aforementioned axially outward flexure indicated at 64 in FIG. 5 and assure a sufficiently tight seal at interface 57,58 as to prevent loss therethrough of pressurized process fluid from the pipeline passage, as well as to assure against loss of sensing fluid at pipeline pressure out of chamber 30 past the interface 60,38.

The radially inner surface 86 (FIG. 5) of the bight portion 34 of resilient cylinder 31 may be flush with the radially inner surfaces 87 of the flanking rings 14 and 15, so as to form a coaxially smooth continuation thereof, or, as shown in FIG. 5, may be of slightly greater diameter, to avoid radially inward protrusion of the edges of cylinder surface 86 into the process fluid stream flowing through the pipeline. This reduces any tendency of fast moving relatively dense process liquid in the pipeline to pull on and attempt to displace cylinder 31, by tripping on or gripping an exposed end edge thereof.

However, resilient cylinder 31 resists unwanted removal from its FIG. 5 engagement by annular disk members 13-15 in several additional ways based on the configuration of its side 35 and lip 37, and on the configuration of groove 57 and relief 45.

First and primary, the axial width S (FIG. 5) of relief space 45 is substantially less than the relaxed radial thickness T (FIG. 4) of lip 37, and hence substantially less than the compressed radial thickness T' (FIG. 5) of lip 37 which at least approaches the full radial width of groove 41. In one example, T was about 30% greater than S, though variation between about 20% and 100% is contemplated. Thus, one factor resisting removal of resilient cylinder lip 37 from its FIG. 5 position is that the relief passage S will not accept the lip 37 of substantially greater thickness T unless a pulling force is applied to the radially inner surface of cylinder 31 sufficient to compress that thickness T down to thickness S to extrude the lip 37 down through passage S.

Other factors resisting removal include the substantially 90° corner at 88 (FIG. 5) which, though radiused to prevent tearing of the resilient cylinder 31, tends to act like a tooth to resist sliding of the lip 37 downward therepast. A further factor resisting loss of lip 37 from groove 41 is the inherent resistance of the lip 37 to bending from substantially at right angles to side 35, into an orientation substantially aligned with such side 35. A still further factor resisting loss of lip 37 from groove 41 is high fricational force generated by axially compressing of lip 37 by the axial force of screws 20 and 21 with or without bolt 75, which high friction force resists any extruding movement of lip 37 toward the space S. A still further factor is that such high friction force is increased by the aforementioned need to compress the oversized lip thickness T as the lip begins to extrude into the relief space S. These several factors acting in concert thus tend to positively preclude extrusion of lip 37 out of groove 41 under any contemplated flow conditions through the pipeline.

As the pressure of fluid, e.g. liquid, in the pipeline passage 84 (FIG. 2) increases from atmospheric pressure, the sides and bight 35 and 34 of resilient cylinders 31 are free to flex from their solid line rest positions toward their FIG. 5 dotted line positions to apply the pressure of process fluid in passage 84 to the sensing fluid in chamber 30 and thence through hole 52 and nipple 51 to pressure gauge 50, so that the sensing fluid pressure applied to gauge 50 linearly represents the instantaneous pressure in pipeline passage 84. Increases in process fluid pressure in pipeline passage 84 also tend to urge resilient cylinder sides 35 radially outward to more firmly pack lip 37 in groove 41. The pressure sensor according to the invention can be used under a wide range of pressure conditions, for example, and not limited to, 1 psi to 700 psi.

Flanking rings 14 and 15 contact the process fluid in the pipeline and may be of any desired material compatible with the characteristics (e.g. corrosive, etc.) of the process fluid, materials such as steel, stainless steel, various plastics, and Teflon-coated metal being contemplated. The annular body 13, on the other hand, does not contact the process fluid and hence need not have special characteristics such as corrosion resistance and so conveniently may be of steel. The sensing fluid filling chamber 30 may be of any conventional type, such as distilled water, vegetable oil, silicon oil, ethylene glycol, and ethylene glycol-water mixture, etc., depending on requirements. Silicon oil is conventionally used for high-temperature applications, vegetable oil and distilled water commonly is used in food applications, and ethylene glycol and water mixed is common for nonspecialized applications.

The pressure sensor 10 embodying the invention may be constructed in a wide range of inside diameters for use with conventional fluid lines of corresponding inside diameter. While usable in larger and smaller sizes, internal diameters of four to ten inches are typical. To give an example of the compactness of the inventive pressure sensor, one such pressure sensor with an inside diameter of six inches employs flanking rings ⅜ inch wide axially sandwiching an annular body 13¾ inch wide axially, for a total axial width of 1½ inches, with about 1¼ inch radial flanking ring thickness. The ¾ inch axial thickness of annular body 13 permits 7/16 inch threaded holes (e.g. ¼ inch NPT) at 52 and 54. In such example, typical thickness dimensions for the bight 34, side 35 and lip 57 of cylinder 31 are about ⅛ inch, 3/32 inch and 9/64 inch, the lip having an axial overhang of about ¼ inch. In that example, the cylinder material employed was Nordel (ethylene propylene elastomer) of about 50±5 durometer, or alternately, Viton (vinylidene-fluoride-hexafluoropropylene copolymer) of about 70±5 durometer or Buna N (butadiene copolymer with acrylonitrile) of about 50±5 durometer.

MODIFICATION

Figure 6:
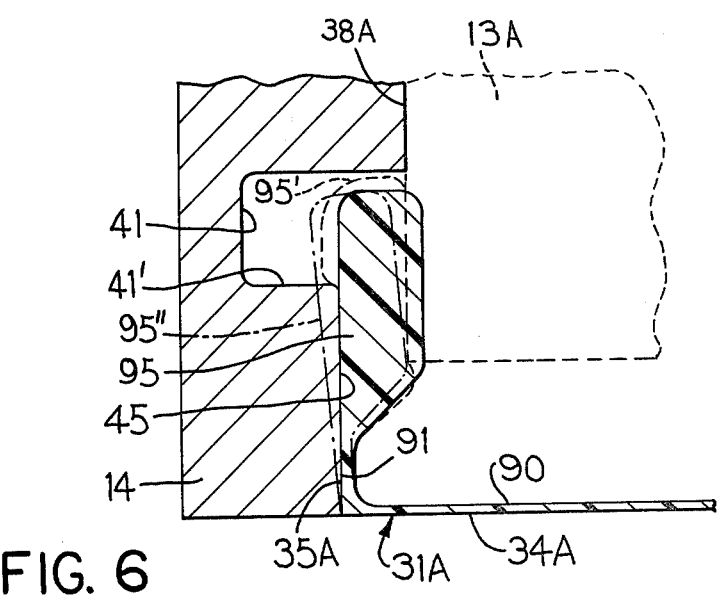
FIG. 6 is a view similar to FIG. 5 but showing a modified type of cylinder.

FIG. 6 discloses a modified cylinder member 31A different from aforementioned cylinder 31 in being made of a substantially harder, less flexible material, here Teflon (polytetrafluoroethylene). To better transfer changes in process fluid pressure in pipeline passage 84 to the sensing fluid in chamber 30, despite the greater material stiffness, the modified cylinder 31A has its sensing fluid chamber facing surfaces of bight 34A and side walls 35A relieved, as indicated at 90 and 91. The resulting reduced thickness of the relieved portions of bight 34A and sides 35A reduces their stiffness and resistance to flexure, and also somewhat enlarges the annular sensing fluid chamber, while leaving unaltered the cylinder surfaces facing the flanking rings and the pipeline passage. Hardening the material of the lips permits less axial compressional deformation thereof, and has been found to require lips axially shorter than above-mentioned lips 37 on cylinders of softer material.

Where the cylinder is of substantially harder, stiffer material, such as Teflon, it has been found that there may be successfully employed a substantially modified lip structure, shown in solid line uninstalled in FIG. 6 at 95, (installed in broken line at 95'). More particularly, the FIG. 6 cylinder side 35A extends radially out to lip structure 95 at a point spaced above bight 34A. The full axial thickness of lip structure 95 is several times that of side 35A. Lip structure 95 is compressed fractionally between opposed walls 45 and 38A of flanking ring 14 and body 13A (e.g. from a rest width 20% to 35% greater than the space between walls 45 and 38A). Lip structure 95 extends radially beyond radially outward facing step 41' and by such compression is extruded axially outward into groove 41 to radially overlie step 41'. The axial spacing of opposed flanking ring faces 45 substantially equals the free axial width of cylinder 31A to avoid buckling of bight wall 34A when clamped between the flanking rings. On the other hand, body 13A is axially wider than the uninstalled space between lip structures 95 and tends to tilt the latter outward (as at 95" in chain lines) when inserted therebetween, such tilting being eliminated by installation of the flanking rings as shown in solid lines.

Figure 7:
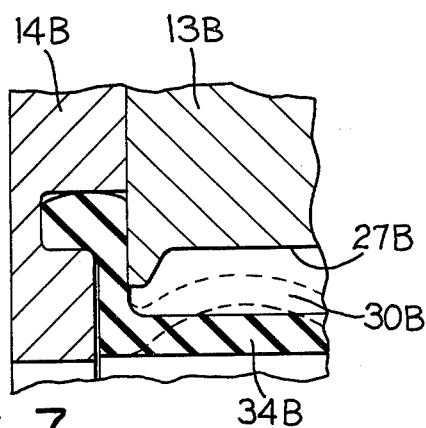
FIG. 7 is a view similar to FIG. 5 but showing a modified annular body structure.

FIG. 7 discloses a further modification usable with substantially scaled-down versions of the pressure sensor 30 which effectively enlarges the volume of sensing liquid and the at-rest volume of the sensing fluid chamber by relieving the radially inward facing surface of the annular body 13B to form a convex surface 27B, here shown as being of truncated inverted V-shape cross section, such convexity also permitting additional room for pressing of the bight 34B into the sensing fluid chamber 30B, Although preferred embodiments of the invention have been disclosed in detail for illustrative purposes, it will be apparent that variations or modifications of the disclosed apparatus, including the rearrangement of parts, lie within the scope of the present invention.

The embodiments of the invention in which an exclusive property or privilege is claimed are defined as follows:

1. A self-contained device for disposition within a fluid line to sense the pressure of fluid in the passage of the fluid line, said device including an annular body and two flanking rings held in coaxially sandwiched relation, said body having an inside diameter greater than the inside diameter of the flanking rings, a resilient cylinder having an intermediate portion disposed within said annular body and defining an annular sensing fluid chamber therebetween, said resilient cylinder also having sides extending from said intermediate portion and gripped between said body and corresponding ones of said flanking rings, said annular body and each said flanking ring having a common interface defined by an axially opposed pair of walls, including the improvement comprising:

means defining an annular groove in one said wall of a said pair, said groove opposing the other wall of said pair across a first axial space, said walls radially inboard of said groove being spaced by a second axial space less than said first axial space;

said cylinder sides each extending radially outward from said intermediate portion through corresponding ones of said second spaces, each said side having an axially widened lip compressed axially in said groove between the end wall of said groove and the opposed said other wall to seal against loss of sensing fluid therepast from said fluid chamber.

2. The device of claim 1 in which said lip has a radial thickness greater than said second axial space to prevent pulling of said lip out of said groove and through said second axial space in response to radially inward forces on said cylinder.

3. The device of claim 1 in which the axial width of said body is about twice the total axial width of said flanking rings.

4. The device of claim 3 in which the sum of axial widths of said body and flanking rings is less than the inside diameter of the latter.

5. The device of claim 1 including axial fasteners located radially outboard of said lips and extending from said flanking rings axially into said body.

6. The device of claim 5 in which said axial fasteners include a circumferential array of threaded holes extending axially through said body, and screws extending through holes in said flanking rings threadedly into said threaded body holes in coaxially opposing pairs, said screws having heads countersunk in the axially outer faces of said flanking rings for flush engagement of said outer flanking ring faces between flanges at opposed ends of fluid carrying pipes.

7. The device of claim 1 in which each said annular groove extends axially into the corresponding flanking ring.

8. The device of claim 7 in which the full axial depth of said groove is in its corresponding flanking ring, the grooved flanking ring wall having a relief defining said second axial space and extending radially inboard from said groove to thus accommodate said side of said resilient cylinder.

9. The device of claim 8 in which said body has planar, radially extending end walls each axially backing the corresponding said side and lip of said cylinder occupying said relief and groove in the opposed flanking ring, said body extending radially inboard past said grooves.

10. The device of claim 8 including means defining a substantially radial hole through said body for connection of a pressure sensor to said fluid chamber, the axial width of said body being less than twice the diameter of said radial hole.

11. The device of claim 1 in which the radial extent of said grooves is greater than the radial thickness of the corresponding lips, providing room for radial expansion of said lips upon axial compression of said lips between the blind end of the corresponding groove and said annular body, and thereby permitting the opposed body and flanking ring walls to be pressed together radially outboard of said grooves.

12. The device of claim 11 in which said second axial space extends radially from the corresponding groove inboard to said fluid chamber and is axially wider than the portion of the cylinder side radially inboard of the lip, said cylinder side portion being free to move and flex at least to some extent in said second axial space, the axially inward faces of said lips being pressed by the blind ends of said grooves against said body to seal the body-flanking ring interface against leakage of sensing fluid from said fluid chamber.

13. The device of claim 11 in which the axial thickness of a said flanking ring is less than twice the axial depth of said groove, said flanking rings being sufficiently stiff to seal said lip against escape of sensing fluid from said fluid chamber with said sensing unit not installed in a pipeline, said flanking rings having radially inner annular portions of their axially outward facing surfaces compressively engageable by the flanges of a pipeline in which the sensing unit is interposed, for securely backing the radially inner portions of the flanking rings when installed in the pipeline to prevent axially outward flexure of said flanking rings at and radially inboard of said grooves therein.

14. The apparatus of claim 1 in which the radially inner surface of said body, which faces into said fluid chamber, is concave in cross section to increase the central thickness of the fluid chamber cross section and thereby provide additional room for radially outward flexure of the central part of the bight of said cylinder.

15. The device of claim 1 in which said cylinder is of a material having a substantially rubberlike flexibility, wherein the bight and side portions, inboard of said lips, are of substantially similar cross sectional thickness.

16. A narrow pressure sensor unit interposable between close-spaced flanges of coaxially opposed pipes, said pressure sensor comprising:

three annular disks held in coaxially sandwiched relation, the center one of said disks having an inside diameter greater than the two flanking disks;

a U-cross section annular cylinder of compressible material having a cylindrical bight connecting substantially radially outwardly extending sides, said cylinder receiving the radially inner cross section of said center disk therein between said sides thereof and leaving an annular fluid chamber radially therebetween;

means defining an axially stepped space in each interface between the radially inner portions of each adjacent pair of disks, said sides of said U-section cylinder having axially widened lips spaced radially outboard of said bight, said bight and the radially inner portions of said sides of said cylinder being substantially thinner than said axially widened lips, each said widened lip being axially compressed between opposed surfaces of the corresponding disks to form a seal between said fluid chamber and the periphery of said pressure sensor unit.

17. The apparatus of claim 16 in which said stepped space is an annular groove in the axially inner face of the flanking disk, said inner face being axially relieved radially inboard of said groove to a lesser axial depth.

18. The apparatus of claim 16 in which said cylinder is of relatively stiff material, said lips being widened axially inward toward each other to receive said center disk snugly therebetween, the radially inner portions of said sides being axially spaced by a distance substantially exceeding the axial thickness of said center disk, axial end portions of said chamber lying radially between the edges of said bight and opposed radially inner surfaces of said lips.

19. The apparatus of claim 16 in which said cylinder is of relatively resilient material, said lips being widened axially outwardly from each other and away from said center disk, the flanking disks being provided with annular grooves opposing said center disk and receiving said lips therewithin in an axially compressed manner.

20. In combination with a pipeline of the kind having a coaxially spaced pair of flanges connectible by a circumferential array of axial bolts or the like, a pressure sensor unit for coaxial sandwiching between said pair of flanges, said pressure sensor unit comprising:

an annular body and two flanking rings held in coaxial sandwiched relation by axial fastening means;

a cylinder having a flexible annular bight wall disposed radially inboard of said annular body, said cylinder further having sides extending radially from said bight wall, each of said sides having a portion sandwiched between axially opposed faces of said annular body and a corresponding one of said flanking rings radially inboard of said axial fastening means, an annular sensing fluid chamber formed radially between said annular bight wall and annular body and axially between said radially extending sides of said cylinder, the outer circumference of said body and flanking rings lying radially within and being surrounded by said circumferential array of bolts connecting said pipe flanges; and means for connecting a pressure sensor to said fluid chamber to permit sensing of fluid pressure within the pipeline.

* * * * *

UNITED STATES PATENT OFFICE
CERTIFICATE OF CORRECTION

Patent No. 4 218 926            Dated August 26, 1980

Inventor(s) Richard B. DeVisser

It is certified that error appears in the above-identified patent and that said Letters Patent are hereby corrected as shown below:

Col. 4, line 42; change "come" to ---some---.

Col. 4, line 66; change "resilient 31" to ---resilient cylinder 31---.

Col. 5, line 15; change "accomodate" to ---accommodate---.

Signed and Sealed this

Twenty-fifth Day of November 1980

[SEAL]

*Attest:*

SIDNEY A. DIAMOND

*Attesting Officer*      *Commissioner of Patents and Trademarks*